POROUS MATERIALS

Filed June 19, 1967 5 Sheets-Sheet 1

INVENTORS
HENRY W. LAVENDEL
EDWARD BRUCE
FRANCIS J. CLAUSS
ALFRED G. ELLIOT
GEORGE C. KUCZNSKI
BY George C. Sullivan
Agent Aug. 20, 1968 H. W. LAVENDEL ET AL 3,397,968

POROUS MATERIALS

Filed June 19, 1967 5 Sheets-Sheet 2

INVENTORS
HENRY W. LAVENDEL
EDWARD BRUCE
FRANCIS J. CLAUSS
ALFRED G. ELLIOT
GEORGE C. KUCZYNSKI

BY George C. Sullivan
Agent

POROUS MATERIALS

INVENTORS
HENRY W. LAVENDEL
EDWARD BRUCE
FRANCIS J. CLAUSS
ALFRED G. ELLIOT
GEORGE C. KUCZYNSKI

BY George C. Sullivan
Agent

POROUS MATERIALS

Filed June 19, 1967 5 Sheets-Sheet 4

INVENTORS.
HENRY W. LAVENDEL
EDWARD BRUCE
FRANCIS J. CLAUSS
ALFRED G. ELLIOT
GEORGE C. KUCZYNSKI

BY [signature]
Agent

POROUS MATERIALS

INVENTORS
HENRY W. LAVENDEL
EDWARD BRUCE
FRANCIS J. CLAUSS
ALFRED G. ELLIOT
GEORGE C. KUCZNSKI

BY George ... [signature]
Agent

United States Patent Office 3,397,968
Patented Aug. 20, 1968

3,397,968
POROUS MATERIALS

Henry W. Lavendel, Palo Alto, Edward Bruce, San Leandro, Francis J. Clauss, Atherton, and Alfred G. Elliot, San Jose, Calif., and George C. Kuczynski, South Bend, Ind., assignors to Lockheed Aircraft Corporation, Burbank, Calif.

Continuation-in-part of application Ser. No. 541,299, Apr. 8, 1966. This application June 19, 1967, Ser. No. 649,789
9 Claims. (Cl. 29—182.5)

Cross-reference to related application

This application is a continuation-in-part application of U.S. patent application Ser. No. 541,299, filed April 8, 1966, and now abandoned.

Background of the invention

Powder metallurgical processes utilized by the art for forming porous materials typically involve the steps of shaping metal powders into a green compact by loose packing, compaction, extrusion, rolling and the like and consolidating the green compact by the mechanism of sintering. These processes are described in detail in, for example, "Treatise on Powder Metallurgy," by C. G. Goetzel, Interscience Publishers, Inc., New York, N.Y., 1949, and "Fundamental Principles of Powder Metallurgy," by W. D. Jones, Edward Arnold, publisher, London, England, 1960.

As a starting material, a quantity of loose, irregularly-shaped metal or metal alloy particles are generally utilized, the principles ranging in average size from about 5 microns to 200 microns, depending on the particular porous material to be formed. The particles of the desired size are typically obtained by means of a sieve of predetermined mesh opening and using either that fraction retained on the seive or, more commonly, the fraction passing through the sieve. Both techniques result in particles having a distribution of sizes around the desired value.

The classified powders are then shaped by loose packing or under pressure into a green compact wherein the metal particles contact each other at many points and areas of their surfaces. Essentially all of the interparticle voids left between the particles remain open to form interconnected pore channels penetrating the body of the compact. These channels are generally of irregular cross section with jagged, sharp-edged walls. The green compact represents a pre-form of the desired finished porous body. It contains the interconnected network of pore channels necessary in the body. These channels, however, are usually of non-uniform size due to their irregular cross section. Additionally, the body is mechanically weak due to insufficient bonding between the particles.

In order to refine pore structure and enhance body strength, the green compact is sintered; that is, heated for a specified length of time at a temperature at which diffusion of metal is activated at the points of contact between the particles so that they become bonded on each other. As sintering progresses, the interparticle contacts grow to form neck-like joints and the pore channels assume a rounded cylindrical shape due to surface tension forces acting on their surface. These forces also promote diffusion flow of metal into the empty channels thereby decreasing their cross-sectional area to the point where the channels become unstable and break down into spherical voids separated from each other by the body of densifying metal. This process is accompanied by a substantial growth of crystalline grains comprising the porous body which causes many of the separated voids to become incorporated in the growing metal grains. It is apparent, therefore, that a fully sintered body is essentially devoid of interconnected pore channels and instead contains a multiplicity of isolated voids within the metal grains to the detriment of mechanical strength.

To obtain a body with interconnecting pore channels it is accordingly necessary to terminate sintering prior to pore channel breakdown. However, it is recognized that for irregular shaped powder particles having a size distribution around an average value the several stages of sintering occur at different times within the body of the compact. Breakdown and closure of pore channels takes place earlier at some locations in the body than in others causing gross inhomogeneities in the structure. It is therefore practically impossible by this technique to control pore size and strength of the finished body which, as a result, contains a wide size distribution of interconnected pores and a multiplicity of isolated voids within the metal structure. Furthermore, the minimum pore size within the wide range of pore sizes found in such bodies is generally limited to approximately 5 microns. This restriction on minimum pore size is due to the fact that the surface tension forces causing pore closure are inversely proportional to the diameter of the pore. The stability of the open channels decreases sharply with diameter with pores of diameters smaller than about 5 microns inherently closing during sintering.

Several modifications of the conventional sintering technique have been utilized by the art in an attempt to more closely control the structure of the formed body. Although somewhat more successful than the basic technique, these modified processes suffer serious disadvantages and in common with the basic technique and for the reasons previously discussed cannot form pore channels smaller than about 5 microns.

By one such technique carefully sized, spherical powders are utilized to form the porous body with the choice of particle size determining the pore diameter of the interconnected channels. For pore diameters larger than about 5 microns sintering can be terminated prior to breakdown of the pore channels since particles uniform in size and shape sinter uniformly. Growth of interparticle joints, formation and shrinkage of cylindrical channels and their eventual breakdown into separated voids accordingly occur in the same sequence throughout the whole compact. A major disadvantage of this technique in addition to the limitation on pore size is the cost and availability of spherical particles. The number of metals and metal alloys available in spherical form is limited and their cost high thereby restricting the types of porous bodies that can be made by this technique. Illustrative processes are disclosed in German Patent No. 918,357 (1954) and Japanese Patent No. 203,580 (1953) dealing with self-lubricating bearings and U.S. Patent No. 2,863,562 (1958) dealing with porous filters.

By another technique, pore-forming materials which volatilize during sintering are blended with the initial powder mixture of the more conventional non-uniform particles. Upon completion of the sintering operation at the proper stage the resultant body will contain pore channels everywhere the pore former initially was. By virtue of the non-uniformity of the initial metal particles, the resultant body contains a large size distribution of interconnected channels, the minimum size channel again being in the order of 5 microns. Illustrative processes are disclosed in U.S. Patents Nos. 2,721,378 (1955), 2,792,-302 (1957) and 2,877,114 (1959).

Both the spherical powder technique and the pore former technique have in common a further disadvantage adversely affecting and limiting the utility of the formed porous bodies. Both techniques require precise control of sintering conditions to ensure termination thereof prior to pore channel breakdown. Similarly, adequate control must be maintained of the environmental conditions in which the bodies are actually used. Since temperatures and times are generally interdependent over a wide temperature range, prolonged heating at temperatures below that used to form the body or additional heating beyond the time and at the temperature utilized to form the body will result in pore shrinkage and closure. The thermal instability of such bodies prevents the obtaining of consistent, predictable performance during operation and can result in total inoperability of the bodies.

Summary of the invention

In accordance with the invention it has been discovered that the aforementioned difficulties can be overcome and unobvious advantages realized by incorporating in sintered metal or metal alloy compositions a dispersed phase of critical amounts of inert dispersoid particles of specified size. To be effective the inert particles must form with the sintered particles a wetting angle of at least 90° as measured from the sintered metal-dispersoid particle interface to the sintered metal-atmosphere interface. The resulting materials exhibit a network of stabilized, interconnected pore channels of narrow size distribution. Moreover, in accordance with the invention, processes are provided whereby initial powders of irregular shape and size in addition to carefully sized spherical powders sinter to form bodies having the unique microstructure of the invention.

The ability to utilize particles of irregular shape and size to form stabilized, interconnected pores of uniform size is unusual and unexpected in the art. The shape of the metal or metal alloy particles is not a limiting factor in forming the interconnected pore channels in the materials of the invention. Particles of any shape can be used so long as the voids remaining between them after they have been loosely packed or pressed together form interconnected pore channels penetrating the body of the compact. Furthermore, the diameter of the stabilized pores can be controlled to sizes significantly less than one micron as contrasted to minimum prior are pore diameters in the order of 5 microns, as measured by E128–61 ASTM maximum pore diameter and permeability test. The factor limiting the minimum diameter of the pores in the materials of the invention is the availability in the are of metal or metal alloy powders which when compounded with fine particles of inert dispersoid and compacted would form a green body with a network of interconnected pores of the desired submicron diameter. As will be subsequently discussed applicants have prepared porous materials having interconnected pore channels of an average diameter of 0.05 micron. As metallurgical techniques are developed for manufacturing controlled grades of metal and metal alloy powders and dispersoid powders which when compacted would form a green compact with ultra-fine interconnected pore channels, pore sizes smaller than 0.05 micron are realizable by the invention.

The interconnected pore channels in the materials of the invention are unexpectedly thermally stable under prolonged heating at temperatures up to and including the sintering temperature utilized to form the material. As contrasted to prior art materials, in the materials of the invention shrinkage of the formed network of interconnected pore channels is substantially inhibited and, accordingly, closure of the channels is substantially precluded even under such rigorous conditions. Further unexpected advantages of the materials of the invention are the uniformity of the included pore channel sizes and the exceedingly high percentage of pore channels that are interconnected. This latter characteristic maximizes the pore volume that is available for the intended purpose of, for example, infiltration with lubricants, filtering, fluid flow distribution and the like. The thermal stability and pore channel uniformity characteristics permit extension of the environmental conditions under which the porous material exhibits consistent, accurate results.

Brief description of the invention

The invention may be more easily understood from the following description and accompanying drawing in which.

Figure 2:
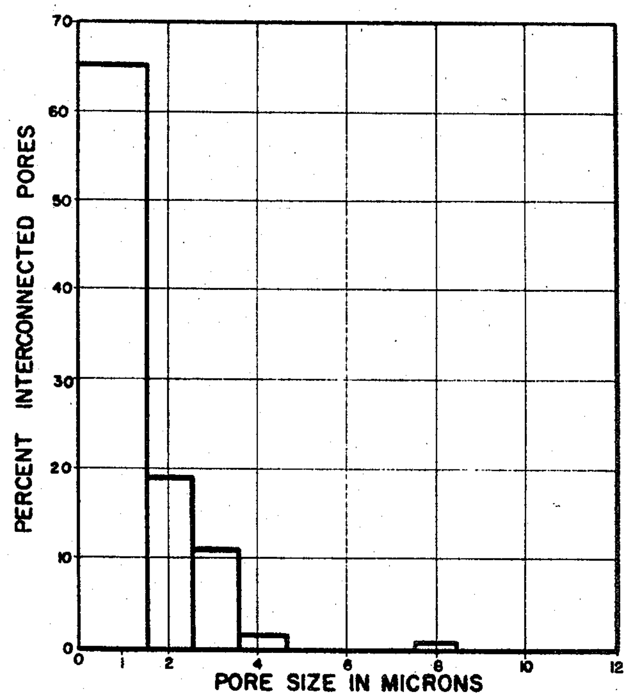
Figure 3:
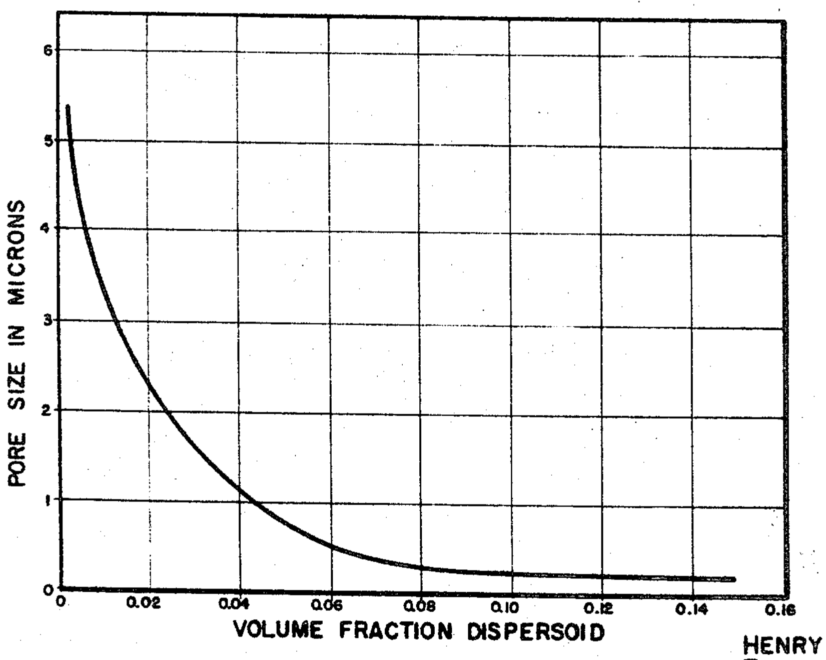
Figure 4:
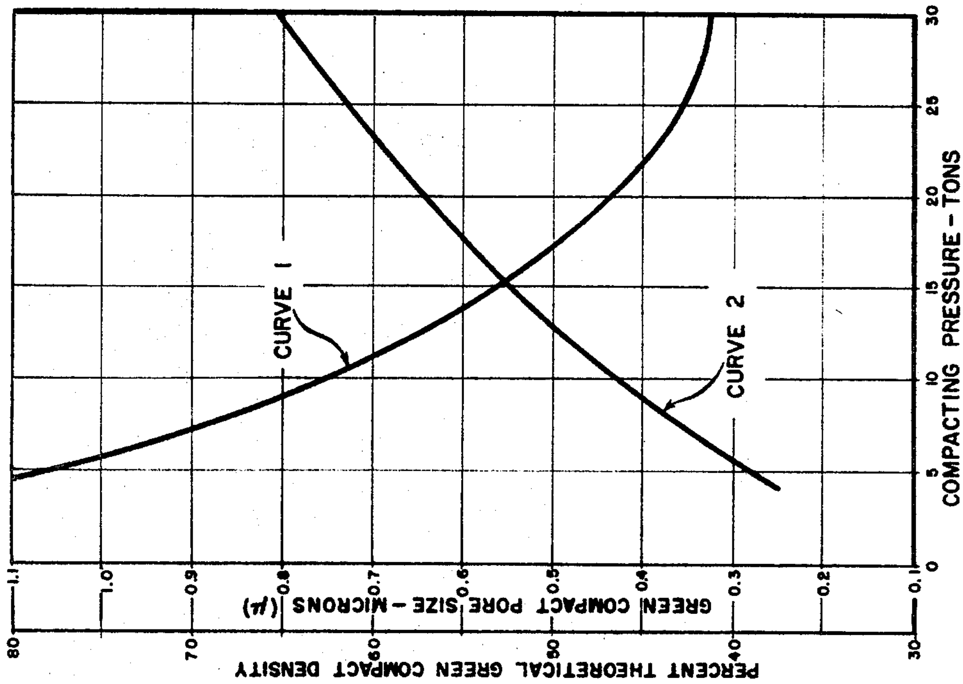
Figure 5:
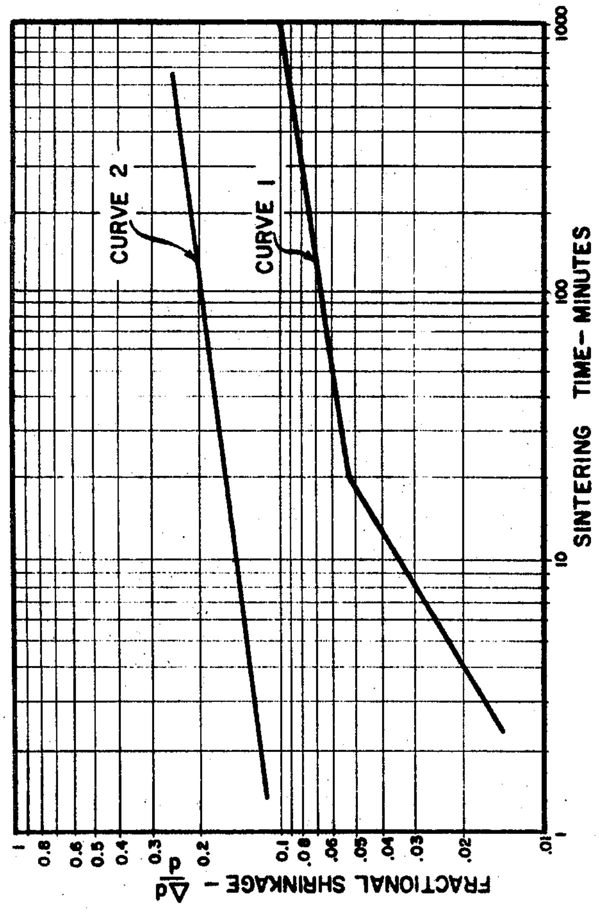
Figure 7:
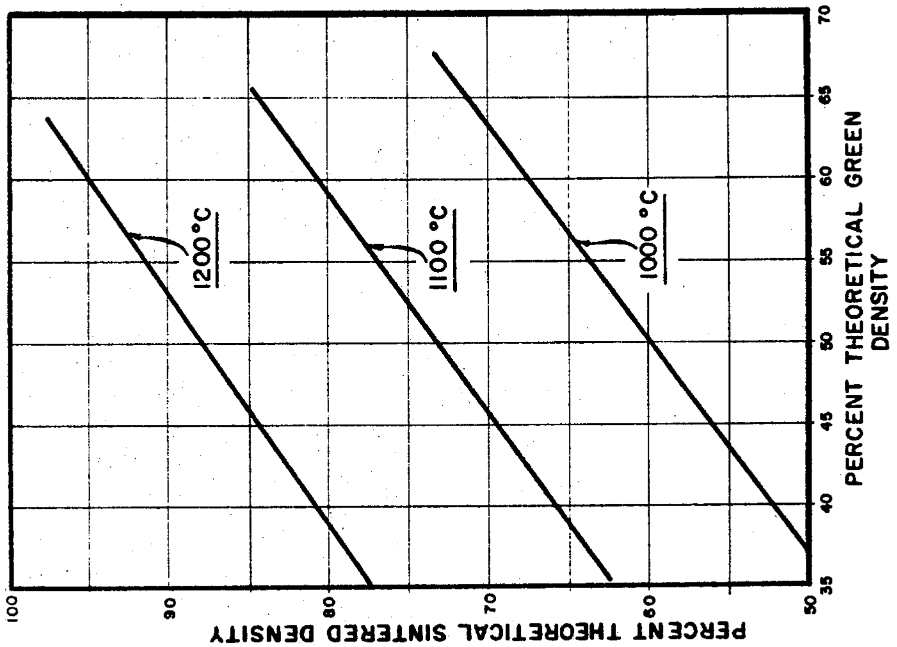
Figure 6:
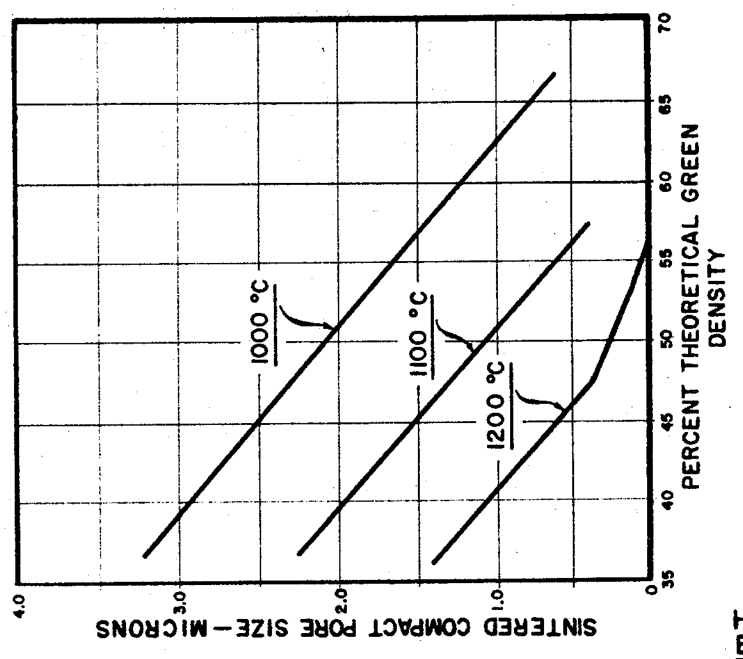
Figure 8:
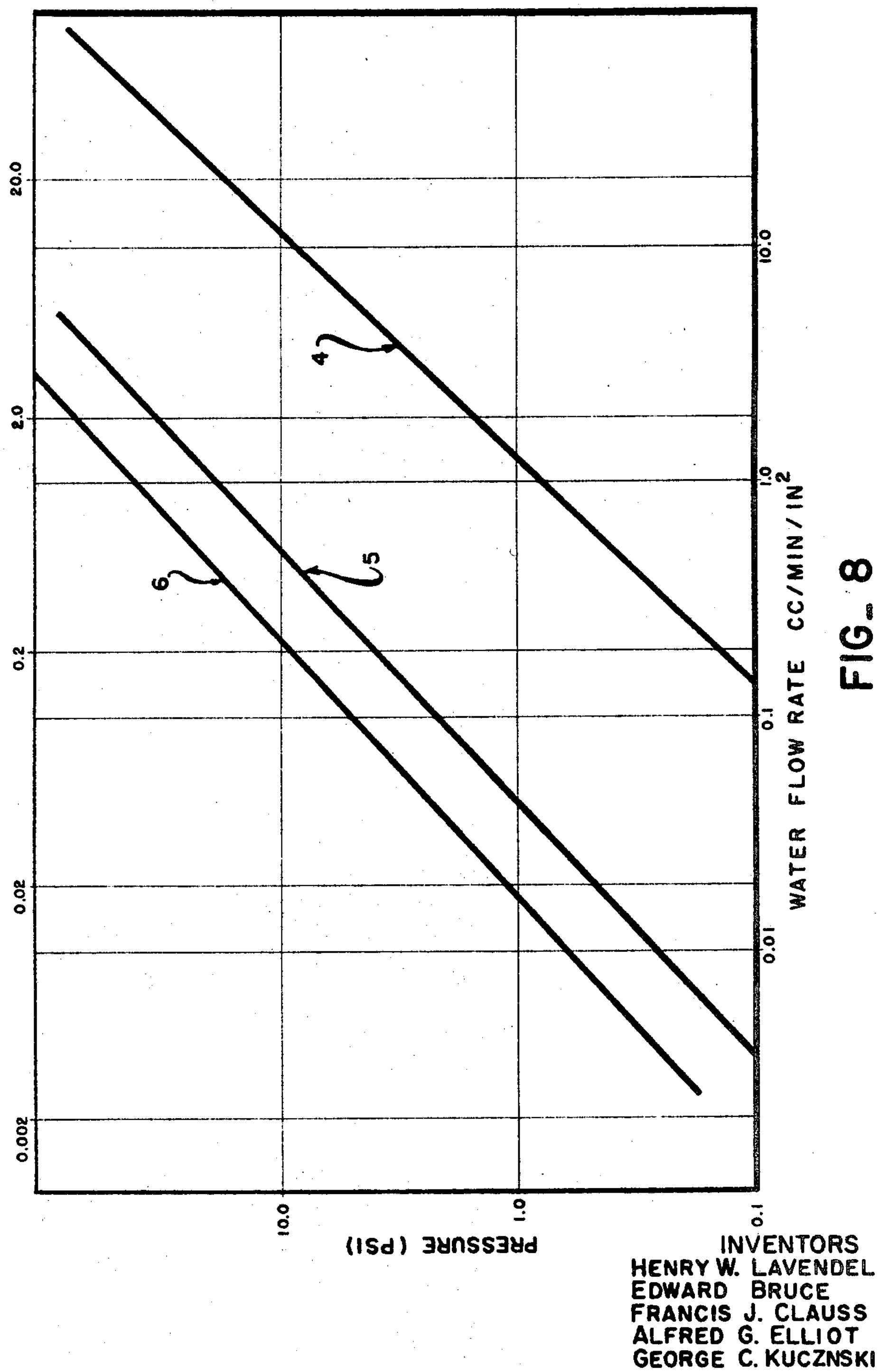

FIGURE 2, on coordinates of percentage interconnected pores and pore size in microns, is a plot showing the distribution of pore sizes in a typical material of the invention;

FIGURE 3, on coordinates of pore size in microns and volume fraction dispersoid concentration, is a plot showing pore sizes as a function of dispersoid concentration in a typical material of the invention;

FIGURE 4, on coordinates of percent theoretical green compact density and green compact pore size in microns and compacting pressure in tons per square inch, is a plot showing the effect of compacting pressure on pore size and density in a green compact of one material of the invention;

FIGURE 5, on coordinates of fractional shrinkage and sinterin time in minutes is a logarithmic plot showing the characteristic sintering rate exhibited by one typical material of the invention and, for comparative purposes, the sintering rate of a conventional prior art material;

FIGURE 6, on coordinates of sintered compact pore size in microns and percent theoretical green density, is a plot showing the relationships between green density and pore size in one illustrative material of the invention;

FIGURE 7, on coordinates of percent theoretical sintered density and percent theoretical green density, is a plot showing the relationship between sintered and green densities at various temperatures for one typical material of the invention; and FIGURE 8, on coordinates of pressure in pounds per square inch and water flow rate in cc./min./in.$^2$, is a logarithmic plot showing water permeability curves for three materials of the invention having varying pore sizes.

Figure 1A:
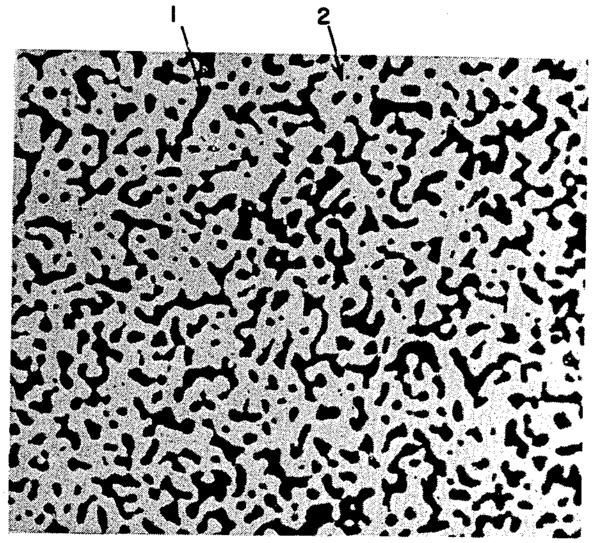
FIGURE 1A is a photomicrograph of 500× magnification of a typical porous material of the invention.

Referring more particularly to FIGURE 1A, there is shown a photomicrograph of a typical porous material of the invention made under 500× magnification. The material consists of a network of pore channels 1 penetrating sintered iron metal structure 2. The material contains 3 volume percent of zirconium oxide dispersoid which has been initially added to the iron powder in the form of 0.015 micron particles. The dispersoid particles in the sintered structure 2 are too small to be visible at the magnification used for photographing the structure. The average diameter of pore channels 1 is 1.5 microns, as measured by lineal analysis of the microstructure. The density of material shown in FIGURE 1 is 68.5 percent of the theoretical density.

Figure 1B:
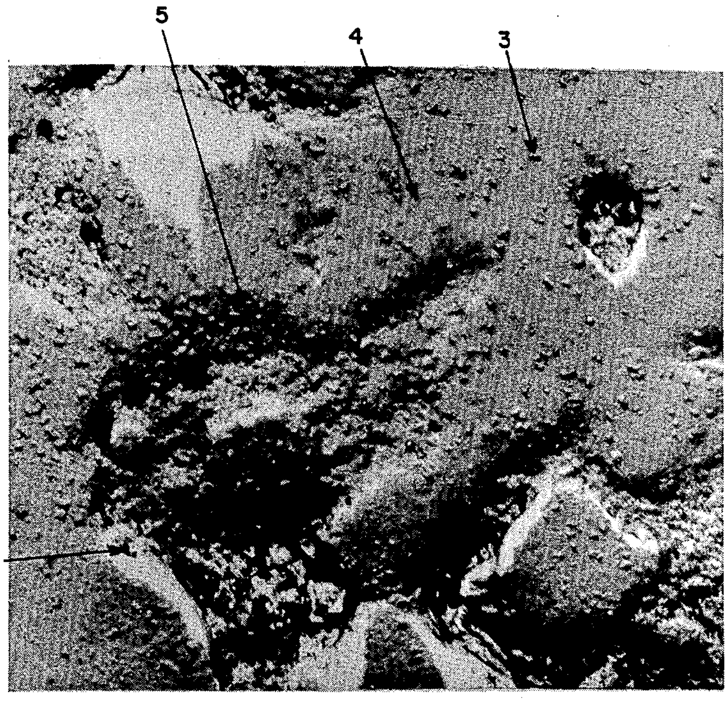
FIGURE 1B is an electronmicrograph of 16,000× magnification of another illustrative porous material of the invention.

The distribution of the dispersoid particles, typical of the sintered material of the invention such as shown in FIGURE 1A, is seen in FIGURE 1B. This figure is an electronmicrograph of porous nickel containing 6 volume percent of thorium oxide made under 16,000× magnification. This magnification is sufficient to clearly show the thoria dispersoid particles 3 embedded in the sintered nickel structure 4 and distributed on the surfaces of the pore channels 5. The average size of dispersoid particles 3 is about 0.075 micron, and the average size of pores 5 is 0.8 micron. The average size of the dispersoid particles 3 is approximately 0.1 that of the average size of pore channels 5.

It has been determined that in the materials of the invention at least 70 percent and generally at least 80 percent of the pore volume within the materials comprise the network of interconnected pore channels, as proven by vacuum impregnation tests. These tests were performed by first determining the density of the dry porous body, impregnating the pores with oil under vacuum and then determining the volume of the absorbed oil. This volume amounted to at least 70 percent of the pore volume within the material and, in most cases, to more than 80 percent. As will subsequently be discussed, the amount of porosity can be controlled in the materials of the invention; that is, it is possible to produce materials containing different volumes of pores of the same average size. The density of the materials of the invention varies from about 30 to 90 percent of the theoretical density and can be controlled within this range. The interconnected pore channel diameters in the materials can be controlled to a minimum size in the order of 0.1 micron, with practical maximum controlled pore diameters being in the order of 25 microns as measured by E128–61 ASTM maximum pore diameter and permeability test. Any desired combination of pore size and density can be obtained within these ranges.

The distribution of pore sizes around the average value is very narrow; that is, the materials of the invention are characterized by very uniform pore size. The distribution of pore sizes characteristic of the materials of the invention is depicted in FIGURE 2 of the drawing. In this figure there is shown the pore size distribution diagram for one material of the invention, Ni-$ZrO_2$ containing 3 percent by volume $ZrO_2$. The pore sizes were obtained by lineal analysis of the microstructure of the material. For this particular material 65 percent of the interconnected pores have pore size diameters of 1.5 microns or less with another 19 percent of the pores being between 1.5 microns and 2.5 microns in diameter.

DESCRIPTION OF THE PREFERRED EMBODIMENTS

To more readily understand the invention, the following mechanism for controlling and obtaining structures illustrated by FIGURE 1 of the drawing is advanced, it being understood that the invention is not so limited. Briefly, controlled quantities of inert dispersoid particles are added to the metal or metal alloy powders prior to processing. The dispersoid particles directly affect the aforementioned diffusion process by which pore channels in the green compact of the material shrink, break down and close when the compact is sintered. In particular, when a green compact is formed, many of the dispersoid particles are entrapped at the points of interparticle contacts between the metal particles and are accordingly distributed on the surfaces of the pore channels within the green compact. Provided there is little or no affinity between the metal and the dispersoid surfaces; that is, when the metal does not wet the dispersoid, a tendency is created which opposes the surface tension forces causing shrinkage and closure of the channels during sintering. When these forces become equilibrated by the repulsion of the metal by the dispersoid, pore channels become stabilized. Since the sintering forces are inversely proportional to the radius of the pore, smaller voids and pores in the compact will be filled with metal and eliminated. Larger pores will remain open as a network of interconnected pore channels of very uniform size. By choosing an appropriate amount of and particle size for the dispersoid particles, pore channels of very small diameters can be retained in the structure which in the absence of such dispersoid particles would normally close.

From the preceding discussion it is seen that the inert dispersoid particles inhibit but do not alter conventional and well understood sintering techniques. As such, any metal or metal alloy system utilized by the art to form sintered bodies are generally equally effective as materials in the instant invention. The inert dispersoid particles distributed on the surfaces of the pore channels within the green compact exhibit their sintering-inhibiting action irrespective of the shape of the metal or metal alloy particles which are used to form the compact. As previously discussed, particles of any shape can be used as long as the voids left between them after they have been loosely packed or pressed together form interconnected pore channels penetrating the body of the compact. In fact among the highest quality materials of the invention are porous bodies permeable to liquids and gases sintered from metal or metal alloy powders composed of flaky particles, that is, thin, flat, elongated or round platelets. The choice of the particular inert dispersoid to use in a given metal system and the amounts thereof are critical, however, to the obtaining of the structures of the invention.

In order to be effective as the sintering control agent in accordance with the invention, the metal or metal alloy powders and the inert dispersoid particles must exhibit a lack of wetting tendency. The physical measure of this tendency is the wetting angle formed between the two phases at the points of interparticle contact under the action of the reciprocal surface tensions. The non-wetting condition required for the materials of the invention prevails when the wetting angle is at least 90°. This angle for the purposes of the invention is measured from metal-dispersoid interface to the metal-atmosphere interface when the two phases are in the solid state since sintering is always conducted below the melting point of the materials.

Commensurate with the art, however, wetting angles between solid phases are difficult to measure. For practical purposes, therefore, it is assumed that the solid metal does not wet the inert dispersoid if it does not do so when in the liquid state. Consequently, when practicing the teachings of the invention it is necessary to establish that the metal or metal alloy does not wet the dispersoid when molten. The scientific literature provides this information for numerous metal-dispersoid systems, particularly for metal-refractory oxide systems which constitute the most common embodiment of the invention. In cases of uncertainty, it is merely necessary to perform a wetting test on the materials intended for the porous body composition. This is readily accomplished, for example, by placing a small quantity of the desired metal on the surface of a plate made of the desired dispersoid and heating the assembly to a temperature above the melting point of the metal but below the melting point of the dispersoid. The experiment is naturally conducted in the atmosphere in which sintering of the porous material of the invention will be carried out since atmosphere has a strong influence on wetting behavior. The molten metal will either spread on the surface of the plate or form a nearly spherical drop. The angle between the metal-dispersoid interface and the metal-atmosphere interface is measured by means of conventional optical apparatus; if an angle of 90° or more is obtained the non-wetting relationship prevails as required by the invention.

Table 1 following sets forth some of the many permissible liquid metal-dispersoid phase systems having wetting angles of at least 90° in the atmosphere denoted by the symbol X. This table is illustrative of the large number of such systems permissible in practicing the invention with other systems being apparent to those skilled in the art in view of the teachings contained herein.

TABLE 1

| Metal | Dispersed Phase | Atmosphere | | | Reference |
|---|---|---|---|---|---|
| | | Neutral | Vacuum | Hydrogen | |
| Fe | $Al_2O_3$ | X | X | | 2, 4, 5 |
| | CaO | X | | | 6 |
| | BeO | X | | X | 4, 6 |
| | $ZrO_2$ | X | X | X | 4, 6 |
| | $ThO_2$ | X | | X | 4, 6 |
| | MgO | X | X | | 4 |
| | $TiO_2$ | | X | X | 4 |
| Ni | $Al_2O_3$ | X | X | X | 4, 5 |
| | $ZrO_2$ | X | X | X | 4 |
| | $ThO_2$ | X | | X | 4 |
| | BeO | X | X | X | 4 |
| | MgO | X | X | X | 3, 4 |
| | $TiO_2$ | X | X | X | 4 |
| | $B_4C$ | X | | | 1 |
| | CaO | | | X | 3 |
| Co | $Al_2O_3$* | | | | 5 |
| | $B_4C$ | X | | | 1 |
| | MgO | | | X | 3 |
| | CaO | | | X | 3 |
| Cr | $Al_2O_3$* | | | | 5 |
| Cr-B | $Al_2O_3$* | | | | 5 |
| Si | $Al_2O_3$ | X | | X | 4 |
| | $ZrO_2$ | X | | | 4 |
| | MgO | X | | X | 4 |
| | $TiO_2$ | X | | X | 4 |
| Ag | CdO | X | | | 2 |
| | ZnO | X | | | 2 |
| | MgO | X | | | 2 |
| | TiC | | X | | 2 |
| | $TaB_2$ | X | | | 1 |
| Cu | TiC | X | X | | 2 |
| | ZrC | X | X | | 2 |
| | UC | | X | | 2 |
| | $TiB_2$ | X | | | 1 |
| | $VB_2$ | X | | | 1 |
| | $B_4C$ | | X | | 1 |
| Cu-Al | $UO_2$ | | X | | 2 |
| Al | $UO_2$ | | X | | 2 |
| | $Al_2O_3$ | | | | 2 |
| | $Al_4C_3$ | | X | | 1 |
| | TiC | X | | | 1 |
| | $B_4C$ | | X | | 1 |
| Sn-Al | $UO_2$ | | X | | 1 |
| Sn | $UO_2$ | | X | | 2 |
| | WC | X | | | 2 |
| | UC* | | | | 1 |
| Pb | $UO_2$ | X | | | 2 |
| | TiC | X | | | 1 |
| | $B_4C$ | | X | | 1 |

*No specific atmosphere specified. Systems are expected to be operative in at least an inert atmosphere.

References:

(1) G. V. Samsonov, "High-Temperature Materials Properties Index"; Plenum Press, New York (1964).

(2) D. T. Livey and P. Murray, "The Wetting Properties of Solid Oxides and Carbides by Liquid Metals," Proc. 2nd Plansee-Seminar, Reutte, Tyrol (1956).

(3) M. Tikkanen, D. O. Rosell, O. Wiberg, "Powder Metallurgy," 10, pp. 49–60 (1962).

(4) M. Humenik, Jr. and W. D. Kingery, "Journal of American Ceramic Society," 37 (1), pp. 18–23 (1954).

(5) Blackburn, Shevlin, Lowers, "Journal of American Ceramic Society," 32 (3), pp. 81–89 (1949).

(6) P. Kozakevitch and G. Urbain, "Journal of Iron and Steel Institute," June 1957, pp. 167–173.

It has been determined that in the materials of the invention, pore size of interconnected channels, size of dispersoid particles, amount of dispersoid and size of metal particles initially used are interdependent. For purposes of discussion particle size is defined as the diameter of a sphere representing an average particle of the powder. The diameter of the stabilized interconnected pore channels in the sintered material decreases with decreasing dispersoid and increasing metal particle size. Conversely, the diameter of the interconnected pore channels increases with increasing dispersoid and decreasing metal particle size. Pore size in the sintered material is further inversely proportional to the volume fraction of dispersoid present in the material. The volume fraction is dependent on the dispersoid particle size, with smaller particles requiring lesser amounts of dispersoid to produce a given diameter pore than the larger particles. This follows from the enhanced uniformity of dispersoid distribution in the materials realized by the smaller size particles.

The current art generally is lacking in adequate methods for controlling the uniformity of shapes and sizes in commercial metal and metal alloy powders. As produced batches of powders differ to a considerable extent from batch to batch in the distribution of sizes and shapes of the powders. Consequently, in practicing the teachings of the invention the preferred technique of controlling pore size is to adjust the volume fraction of the dispersoid used in a given batch of starting material with any variation in particle sizes being automatically compensated for. This is illustrated by FIGURE 3 of the drawing which depicts the relationship in one material of the invention, Ni-$ZrO_2$, between pore size and volume fraction dispersoid concentration. The indicated pore sizes were obtained by the aforementioned E128–61 ASTM test of the material's microstructure. As shown in the figure, pore size continuously decreases from a maximum of approximately 5.3 microns to a minimum of 0.2 micron as dispersoid volume fraction increases from 0.002 to 0.15. It has been determined that for materials of the invention pore sizes up to about 25 microns as determined by the aforementioned E128–61 ASTM test can be controlled in accordance with FIGURE 3 by varying the dispersoid volume fraction from a minimum of approximately 0.001 to a maximum of approximately 0.2. Within these limits the number of dispersoid particles distributed on the surfaces of the interconnected pore channels is sufficient to stabilize the channels but less than that number which would cause blockage of the channels.

Desirably the dispersoid particles in the starting mixture are as small as possible to prevent their interference with the pore channel network with the only limitation on minimum size being the practical limit of availability of sizes below about 0.01 micron. It has been found that dispersoid particles are desirably less than one-third the size of the pore channels; for larger sizes the particles tend to block and close many of the pores to the detriment of usable pore volume. Preferably, the particle sizes are 0.1 or less of the pore size. To ensure that the dispersoid particles in the materials of the invention are within these limits, there must be taken into account the tendency of many particles to grow during sintering. When such growth occurs, the dispersoid particles in the initial mixture prior to processing must naturally be smaller than the aforementioned sizes. Such growth can readily be compensated for by workers skilled in the art; for example, to ensure a particle size below 0.05 of the desired pore diameter, the dispersoid in the initial mixture would be approximately 0.03 of the desired pore diameter.

For the purposes of the invention, the sizes of the metal particles in the starting mixture generally vary from 0.01 to 150 microns for pore sizes up to about 25 microns. Within this range, and by way of illustration, metal particle sizes between 0.5 and 50 microns would typically be used to form interconnected pore channel diameters between 0.3 and 5 microns.

In making the materials of the invention it is apparent from the preceding discussion that the initial powder mixture should be such as to ensure uniform distribution of dispersoid particles at the surfaces of the metal particles during formation of the green compact. This necessitates the formation of a uniform mixture wherein the dispersoid particles are located at or on the surface of the metal particles. No significant separation of the phases should occur causing some metal particles to be devoid of or have less dispersoid on their surface than other metal particles. Local concentration or agglomeration of the dispersoid should also be avoided in the mixture. The relative concentration and sizes of the metal and dispersoid powders must naturally be such as to produce upon further processing the desired microstructure in the finished body.

Several techniques have been found suitable in satisfying the preceding requirements. The mixture can be formed by mixing or mechanically blending the dispersoid powder with the metal or metal alloy powder in accordance with techniques described in the texts referred to herein. By another method the desired mixture is prepared by depositing the dispersoid on the surface of the metal particles by chemical means. The process described by N. J. Grant in "Powder Metallurgy," vol. 10, pp. 1 through 12, and also in U.S. Patent 3,175,904, issued Mar. 30, 1965, is particularly effective in forming initial mixtures by chemical means. In accordance with this method a decomposable salt of the desired dispersoid, for example, $Th(NO_3)_4$, is dissolved in correct proportions in a suitable solvent such as methyl or ethyl alcohol. The selected metal or metal oxide powder is then carefully mixed with the solution. With continuous stirring the solution is gently heated to drive off the solvent. When the resulting mix is dry it is then further heated at higher temperatures in an inert atmosphere, followed by decomposition of the salt in an appropriate atmosphere such as dry hydrogen. A subsequent reduction step at suitable temperatures yields the desired metal-dispersoid mix. Still another chemical method for forming the initial mixture is described in copending U.S. application Ser. No. 517,792, filed December 30, 1965. By this method a solution of metal and dispersoid salts in correct proportions is polymerized. The polymer is then oxidized under controlled conditions to produce an intimate mixture of finely divided oxides. The oxide powder mixture is then treated under appropriate conditions to reduce the metal alloy oxides resulting in a very fine, uniformly sized metal particles having on its surface fine dispersoid particles.

The pore size of channels in the finished product is influenced not only by the concentrations and sizes of metal and dispersoid particles and sintering conditions but also by the degree of compaction experienced in forming the green compact. The green compact may be formed by any of the various state-of-the-art techniques, including, for example, uni- or multi-directional die pressing, isostatic pressing, powder rolling, extruding and the like. Various degree of compaction are achieved in these processes resulting in a variety of pore size ranges in the green compact. As such, pore size and density of the green body must be determined as a function of the degree of compaction. Illustrative of this type of behavior in the materials of the invention is the variation in green density and green compact pore size of a $Ni/ZrO_2$ mixture containing 0.7 percent by volume $ZrO_2$ under the compacting pressures shown in FIGURE 4 of the drawing. In this figure curve 1 shows the effect of compacting pressure on pore size while curve 2 shows the effect of compacting pressure on percent theoretical density. As shown by the figure, increasing compacting pressures increase density and decrease pore size. Curves of this type are readily determinable for the initial mixtures of the invention, which curves are then related to the microstructure of the formed body in order to obtain the microstructure of the green compact required to produce the desired finished microstructure.

The transition between the initial green compact microstructure and final microstructure occurs under the influence of the sintering environment. The temperature has a significant influence on the final microstructure. After a short initial period, sintering time has little effect on the final microstructure. It has been found that when the green compact is sintered at constant temperature the compact undergoes a relatively rapid densification, that is, shrinkage, during approximately the first two hours of heating. In this period of time the smallest pores shrink and close and the dispersoid particles grow until equilibrium with the sintering temperature is achieved. Further heating causes only minor densification. The actual rates of the initial and final densification depend, of course, on the nature and composition of the green compact. This is illustrated by FIGURE 5 of the drawing. In this figure curve 1 shows the fractional shrinkage of one material of the invention, $Ni-ZrO_2$, containing one volume percent $ZrO_2$, as a function of sintering time at a constant temperature of 900° C. in vacuum. For comparative purposes, curve 2 of the figure shows the fractional shrinkage of conventional nickel powder under the same conditions. This figure shows the effect of the inhibiting dispersoid in the materials of the invention and the advantages so gained. As shown, the materials of the invention sinter to lower densities than prior art materials and exhibit a significantly enhanced stability over prior art materials as shown by the very small change in density under prolonged firing conditions. Although not shown, it has been determined that curve 1 of FIGURE 5 is exemplary of the materials of the invention for varying sintering temperatures up to approximately 0.9 of the melting point on the absolute temperature scale of the metal or metal alloy component of the materials. As used herein fractional shrinkage is a measure of the change in diameter of the compact to the diameter of the compact at any given sintering time.

To realize the wide range of pore size-density combinations permissible in a given metal or metal alloy-dispersoid system of the invention, it is desirable to initially prepare several powder batches each containing differing amounts and sizes of dispersoid. Each batch of powder is then characterized as to its sintering behavior as a function of the compacting pressure and sintering conditions to determine changes in pore size and density. In general the sintering time should not be shorter than about one hour and preferably is at least two hours to achieve the proper degree of pore stabilization in the structure.

The compacting pressures are varied over a range starting with the lowest pressure resulting in a coherent green body up to the highest pressure short of causing laminations or other defects in the sample. The sintering temperatures vary from about 0.5 to 0.9 of the melting point in degrees Kelvin of the chosen metal or metal alloy. A temperature within this range is generally applied in the art for sintering metal and metal alloy powders because only at temperatures above approximately 0.45 of the absolute melting point of the powder will the material transport processes responsible for bonding together the adjacent particles in the compact become fast enough for practical commercial operation. Density and pore size are determined on both the as-compacted green bodies and the sintered samples. The density is determined by measuring the volume and weight of the samples while pore sizes are determined from measurements such as lineal analysis on polished metallographic cross sections or from the aforementioned bubble point or mercury intrustion methods. The resulting data serves as a basis for plotting diagrams of pore size versus density for each sintering temperature. This is illustrated by FIGURE 6 of the drawing wherein there is shown for differing temperatures the effect of green density expressed as percent of theoretical density on pore size in microns as determined by the aforementioned ASTM test for one sintered material of the invention, $Ni-ZrO_2$ containing 0.7 percent by volume $ZrO_2$. Each point on each curve defines the green density needed to obtain a given sintered pore size.

Appropriate diagrams are then constructed relating green density to sintered density and pore size at various sintering temperatures. This is illustrated in FIGURE 7 of the drawing depicting the relationship between green density and sintered density both expressed as percent theoretical density, for one material of the invention, $Ni-ZrO_2$ containing 0.7 percent by volume $ZrO_2$.

Based on the preceding discussion and information, a finished body is readily produced having any given stabilized pore size and density combination within the limits of the invention.

Specific examples of procedures used in making materials and articles of manufacture of the invention are given below. These examples are to be considered as illustrative only and not as limiting in any manner the scope and spent of the invention as defined by the appended claims. The procedures, for example, described in the examples for producing microporous structures from stainless steel and Hastelloy B powders are equally applicable to flake-shaped powders of nickel-chromium base alloys which are available in the art. The alloys from which these powders are made are usually of the austenitic type and contain additions of aluminum, titanium and a refractory metal of the group niobium, tantalum, molybdenum and tungsten which strengthen the nickel-chromium matrix by forming in it fine precipitates of intermetallic compounds. The use of flake-shaped metal and metal alloy particles to form the porous materials of the invention is more particularly described in copending U.S. patent application Ser. No. 686,311, filed Nov. 28, 1967. It is further understood that the term "metal" in the appended claims encompasses both metal and metal alloy systems.

EXAMPLE 1

In one illustrative embodiment of the invention, self lubricating ball bearing retainer materials were manufactured and tested. An initial powder mixture was formed in accordance with the following table.

TABLE 2

| Sample | Weight, grams | Composition, percent by weight |
|---|---|---|
| 1 | 1.996 | NiO, 3% $ThO_2$. |
| 2 | 2.038 | NiO, 3% $ThO_2$. |
| 3 | 11.90 | NiO, 3% $ThO_2$/25% Cr, 3% $ThO_2$. |

The size of the nickel oxide and chromium particles varied from approximately 1 to 5 microns in diameter and the size of the thoria dispersoid particles was less than 0.1 micron in diameter. For this particular embodiment the starting compositions were obtained in accordance with the process described in the aforementioned patent application Ser. No. 517,792 which resulted in the dispersoid particles being located on the surface of the metal particles. To prepare the NiO-3% $ThO_2$ composition, a solution of 1880 grams $NiCl_2.6H_2O$, 105 grams Th $(NO_3)_4.4H_2O$, 2300 grams sugar, 1250 grams resorcinol and 105 grams concentrated HCl in 5100 ml. water was mixed with 1350 grams of formalin (36–38% HCHO) to polymerize and cross-link the system into a firm mass of material. The polymer mix was then burned in a furnace in circulating air at 590° C. for 7.5 hours. The product was a fine powder of NiO-$ThO_2$ having a surface area of 2.81 square meters per gram as determined by the BET method, corresponding to an average particle diameter of about 0.4 micron.

The Cr–3% $ThO_2$ composition was prepared by polymerizing with 1620 grams of formalin (36–38% HCHO) a solution containing 2466 grams $CrCl_3.6H_2O$, 31.14 grams $Th(NO_3)_4.4H_2O$ 2760 grams sugar, 1500 grams resorcinol and 6120 ml. water. The polymerized mass was burned in air in a furnace heated to 600 C. until all carbonaceous material was removed from the product. The surface area of the powder was found to be 38 square meters per gram corresponding to an average particle diameter of 0.03 micron. This powder was reacted with magnesium metal to reduce the chromium oxide to free chromium metal. Magnesium turnings were mixed with the powder, using 10 percent excess over the calculated amount necessary to reduce all the $Cr_2O_3$ in the mixture, and the mixture, contained in an Armco iron container was heated to 800 C. in a hydrogen furnace. After one hour dwell at this temperature the reacted mixture was cooled to room temperature and the excess magnesium metal and the magnesium oxide, generated by the reaction with $Cr_2O_3$, were removed from the material by washing with dilute $HNO_3$ acid.

Two percent by weight methocel was added to the NiO–3% $ThO_2$ and NiO–3% $ThO_2$/Cr–3% $ThO_2$ powders as a binder and the mixtures were then compacted into green compacts as shown in the following table which also sets forth the diameters and thicknesses of the compacts.

TABLE 3

| Sample | Pressure, t.s.i. | Diameter, mm. | Thickness, mm. |
|---|---|---|---|
| 1 | 25 | 12.74 | 3.48 |
| 2 | 10 | 12.73 | 4.03 |
| 3 | 10 | 13.0 | 7.68 |

The compacts were then placed in a tube furnace and the nickel oxide was reduced to nickel at a temperature of 350° C. in an atmosphere of hydrogen. The temperature was then raised and the compacts sintered as shown in the following table:

TABLE 4

| Sample | Temperature, ° C. | Time, hours | Percent Theoretical Density |
|---|---|---|---|
| 1 | 1,350 | 3 | 77.4 |
| 2 | 890 | 5 | 47.0 |
| 3 | 1,300 | 5 | 54.4 |

The samples were then hand polished through 3/0 emery paper and vacuum impregnated with G. E. Versilube F–50 silicone oil. The weight of oil impregnated was divided by specimen volume to provide a common basis for comparison. The following table shows weights of oil impregnation (grams oil per cc. sample volume), efficiency of impregnation (percent pore volume impregnated) and average bleed rate over a four month interval (grams oil per cc. sample volume per minute).

TABLE 5

| Sample | Wt. of Oil Impregnation | Efficiency | Bleed Rate |
|---|---|---|---|
| 1 | 0.23 | 95.6 | $0.54\times10^{-6}$ |
| 2 | 0.29 | 94.2 | $0.46\times10^{-6}$ |
| 3 | 0.52 | 100.0 | $2.86\times10^{-6}$ |

In comparison, the average bleed rate of a commercial grade synthane retainer over the first 17 hour period was determined to be between 0.35 and $0.50\times10^{-6}$. After 17 hours meaningful bleed rates could not be obtained because of the small amount of oil remaining in the synthane retainer. The superiority of the retainers of the invention is due to the fact that upwards of 100 percent of the pore volume in the materials is available for oil impregnation. The tensile strength of the formed samples was approximately 27,000 p.s.i. During tensile strength testing the materials of Table 3 experienced a reduction in area of approximately 2.5 percent.

EXAMPLE 2

In another illustrative embodiment of the invention, porous materials useful as metering devices to deliver low water flow rates were manufactured and tested. An initial powder mixture was formed in accordance with the following table and the procedure discussed in conjunction with the preceding illustrative embodiment.

TABLE 6

| Sample | Weight, grams | Composition, Percent by Weight |
|---|---|---|
| 4 | 35.058 | NiO,3% $ZrO_2$ |
| 5 | 29.777 | NiO,1% $ZrO_2$ |
| 6 | 29.824 | NiO,1% $ZrO_2$ |

The powders were then heated in hydrogen at 600° C. to selectively reduce the nickel oxide to nickel. The reduced powders were then compacted into green compact as shown in the following table which also sets forth the diameters and thicknesses of the compacts.

TABLE 7

| Sample | Pressure, t.s.i. | Diameter, mm. | Thickness, mm. |
|---|---|---|---|
| 4 | 4.5 | 69.9 | 2.81 |
| 5 | 16.7 | 69.9 | 1.59 |
| 6 | 20.0 | 69.9 | 1.51 |

The samples were then sintered in hydrogen in accordance with the following table:

TABLE 8

| Sample | Temperature, ° C. | Time, hours | Percent Theoretical Density | Pore Size Diam., (μ) |
|---|---|---|---|---|
| 4 | 1,080 | 2 | 61.5 | 1.5 |
| 5 | 1,100 | 2 | 79.0 | 1.0 |
| 6 | 1,100 | 2 | 81.6 | 0.5 |

The sintered samples had dimensions as set forth in the following table:

TABLE 9

| Sample | Diameter, mm. | Thickness, mm. |
|---|---|---|
| 4 | 58.34 | 2.41 |
| 5 | 61.5 | 1.43 |
| 6 | 61.72 | 1.37 |

The water flow rate in cc./minute/in.$^2$ was then determined at varying pressures for the fabricated samples and plotted in accordance with FIGURE 8 of the drawing. To obtain comparable results, the thickness of each sample was normalized to one-sixteenth of an inch.

EXAMPLE 3

Illustrative of another procedure for preparing materials of the invention, an initial powder mixture was made in accordance with the aforementioned process described by N. J. Grant in "Powder Metallurgy." By this technique, 100 grams of nickel powder of 1 to 5 microns in diameter was washed with a one percent by weight solution of $Th(NO_3)_4.4H_2O$ and the mixture then decomposed to Ni-2%$ThO_2$ (2% by weight). The dispersoid particles were about 0.1 micron in diameter. The powder mixture was then compacted at 21,000 p.s.i. and sintered in vacuum for four hours at 1000° C. The theoretical density of the resulting body was 70 percent. An analysis of the porous microstructure showed that the average diameter of the interconnected pores was 2.5 microns.

EXAMPLE 4

A microporous type 316 stainless steel tube was produced for use as a fluid metering device in a printing or copying machine. The purpose of the device is to apply a fluid uniformly and continuously to moving paper by a rolling action. The microporous stainless steel used for this device is characterized by moderate water flow rate, good formability and high temperature pore stability in dry (—65° F. dew point) hydrogen to 1200° C. and in air to 550° C. The weight of the stainless steel tube approximated 200 grams and was produced from powder made as follows.

124.2 grams of zirconyl nitrate was dissolved in 4.3 liters of distilled water. Six drops of alkyl phenoxy polyethoxy ethanol, sold by Rohm & Haas, Philadelphia, Pa. under the name Triton X–100 were added to the solution. Three kilograms of —325 mesh flake-shaped type 316 stainless steel powder Grade 756 sold by Alcan Metal Powder Co., Elizabeth, N.J., were then added to the solution. When the powder was thoroughly dispersed, the pH of the thick slurry was 4.5. After mixing for 30 minutes, investment of the metal powder with dihydrated zirconyl/diammino nitrate complex was carried out by the addition of 28 percent ammonium hydroxide solution until the pH of the slurry was raised to 8.2. This required 55 ml. of the ammonium hydroxide solution. Mixing was continued for another 15 minutes and then the slurry was filtered through a vacuum filter. The filter cake was washed with distilled water until the pH of the filtrate was lowered to 7. The water wash was followed by acetone wash to remove the free water present. The acetone-washed filter cake was allowed to air-dry until the powder was again free flowing. The air dried powder was sieved through a 48-mesh screen to be sure that there were no aggregates formed during the above operations.

The zirconyl-complex invested powder was loaded into nickel trays to a depth of less than one inch. The loaded trays were placed into an electrically heated Inconel tube furnace and exposed to a continuous stream of dry hydrogen. The powder was then heated to 900° C. and maintained at temperature for three hours to decompose the dihydrated zirconyl/diammonium nitrate adhering onto each particle to zirconium oxide and allow the hydrogen stream to remove the water and oxides of nitrogen formed during the decomposition. At the end of three hours, the temperature was raised to between 1000 and 1050° C. and kept there for one hour. At the end of the heat cycle, the furnace was allowed to cool to room temperature, hydrogen was stopped and the tube filled with nitrogen to displace the hydrogen. The heat treated powder was removed and found to be 100 percent less than 100 mesh.

The resulting stainless steel powder containing two percent by weight zirconium oxide was isostatically compacted in rubber tooling at 6,000 p.s.i. After ejection from the tooling, the compacted tube was sintered in dry hydrogen of —65° F. dew point, at 1225° C. for two hours. After facing the ends the sintered tube was 9.5 inches long and had an 1.83 inch outside diameter with a 0.05 inch wall. The tube had a pore volume of 44.2 percent and an average pore size of 0.9 micron as determined by the E128–61 ASTM test. The water flow rate of 0.045 ml./min.-in.$^2$ was obtained through the walls of the tube at a differential pressure equivalent to 6 inches of water. Ultimate tensile strength of the tube was approximately 10,000 p.s.i.

EXAMPLE 5

A microporous type 316 stainless steel foil was produced by powder rolling for use as a high flow rate filter medium. The microporous stainless steel used for this medium is characterized by superior formability as compared to mechanically or isostatically compacted parts. The stainless steel foil weighed approximately 10.5 grams and was made from the same stainless steel flake powder containing two percent by weight zirconium oxide used for the preparation of the porus tube of Example 4. The powder was rolled in the following manner:

(a) The mill rolls were set in a closed position under pressure;

(b) The powder is screeded onto a paper sheet base 6 inches wide by 9 inches long to a depth of .03 inch;

(c) The powder was covered with paper so as to produce a sandwich;

(d) The sandwich was fed to an 8 inch wide rolling mill at a roll speed of less than 3 feet per minute; the rolled-compacted foil was approximately 0.005 inch thick.

The paper on the foil was then peeled away and the rolled powder foil sintered in —65° F. dewpoint hydrogen for two hours at 1225° C. The sintered foil, after trimming, was 4 inches wide by 7 inches long by 0.004 inch thick. The foil had a pore volume of 28.8 percent and an average pore size of 1.75 microns according to ASTM E128–61. The water flow rate through the foil at 30 p.s.i. differential pressure was 418 ml./min.-in.$^2$

EXAMPLE 6

Microporous nickel discs were produced for a prototype of a spacecraft life support system component. This component is a porous sublimator plate which prevents free water from escaping out of the spacecraft to contaminate exterior surfaces such as optical systems. This is accomplished by freezing out the water on the inside surface of the porous plate while the outside surface is exposed to the vacuum of space. Thus, the ice is allowed to sublime to water vapor which escapes through the pore channels. The microporous nickel used for this component is characterized by an average pore size selected from the range of 2.5 to 5.0 microns and a stability of pores and overall dimensions to 1150° C. in inert atmosphere or vacuum. Discs 1.5 inches in diameter and weighing 12 grams were produced from powder which was prepared as follows.

191 grams of zirconyl nitrate was dissolved in 2 liters of distilled water and to this added 4600 grams of −325 mesh nickel powder Grade F 230 purchased from the Glidden Company, Metals Division, Johnstown, Pa. Mixing of the slurry was continued for about 15 minutes and then 55 ml. of 28 percent ammonium hydroxide solution were slowly added to invest the metal powder with dihydrated zirconyl diammino nitrate complex. At the end of the alkali addition the pH of the slurry was about 8. The mixing of the slurry was continued for 30 minutes and then the slurry was filtered through a vacuum filter. The filter cake was washed with distilled water until the pH of the filtrate was lowered to 7. The washed filter cake was dried at 110° C. in a drying oven. The dried invested powder was sieved through a 100-mesh screen. The nickel powder containing a quantity of the zirconyl complex equivalent to two weight percent zirconium oxide was loaded into a standard double acting die with a 1.5 inch diameter cavity. Disc were mechanically pressed at two compaction pressures, with the following results:

| Disc No. | Compaction pressure, t.s.i. | Diameter, mm. | Thickness, mm. | Percent Pore Volume |
|---|---|---|---|---|
| 11027-46-1 | 5 | 38.16 | 2.13 | 42.8 |
| 11027-46-13 | 10 | 38.16 | 1.82 | 36.8 |

These discs were then sintered in hydrogen of approximately −30° F. dewpoint for 2 hours at 1200° C. During sintering the zirconyl complex decomposed to generate zirconium oxide dispersion at the surface of the metal particles. The properties of the sintered discs are summarized as follows:

| Disc No. | Diameter, mm. | Thickness, mm. | Average Pore Size Microns | Percent Pore Volume |
|---|---|---|---|---|
| 11027-46-1 | 35.71 | 1.95 | 4.5 | 30.4 |
| 11027-46-13 | 36.04 | 1.82 | 2.5 | 24.2 |

Pore sizes were measured by the E128–61 ASTM test. To demonstrate that these discs had inherent dimensional stability at elevated temperature, the discs were refired in −30° F. dewpoint hydrogen at 1150° C. for two hours. Results of this firing are set forth below.

| Disc No. | Diameter, mm. | Thickness, mm. | Percent Dimensional Shrinkage | Percent Pore |
|---|---|---|---|---|
| 11027-46-1 | 35.60 | 1.94 | 0.3 | 29.6 |
| 11027-46-13 | 35.95 | 1.81 | 0.2 | 23.3 |

NOTE.—No change in the pore diameter was noted.

EXAMPLE 7

A microporous nickel sheet was produced for use as a component in a life support system of the manned space vehicle described in Example 6. The microporous nickel used for this device is characterized by an average pore size selected from the range of 0.5 to 2.5 microns and pore size stability in dry hydrogen to 900° C. The nickel sheet weighed approximately 100 grams and was produced from powder prepared as follows.

320 grams of zirconyl nitrate were dissolved in 7350 ml. of distilled water and to this was added 8000 grams of nickel powder Grade G–08 purchased from Sheritt-Gordon of Canada. The average particle size of this powder was between 1.5 and 3 microns. The slurry was allowed to mix for over 30 minutes and then 118 ml. of 28% ammonium hydroxide solution was slowly added to invest the metal powder with dihydrated zirconyl diammino nitrate complex. At the end of the alkali addition the pH of the slurry was about 8, the mixing of the slurry was continued for 30 minutes and then the slurry was filtered thorugh a vacuum filter. The filter cake was washed with distilled water until the pH of the filtrate was lowered to 7. The washed filter cake was dried at 110° C. in a drying oven. The dried zirconyl-complex invested powder was sieved through a 100-mesh screen.

The nickel powder containing a quantity of the zirconyl complex equivalent to two weight percent zirconium oxide was mechanically compacted in a 6 inch by 9 inch die at 10,000 p.s.i. into a plate of thickness of approximately 0.035 inch. After removal from the die, the compacted plate was sintered in dry hydrogen of −30° F. dewpoint at 960° C. for two hours. During sintering the zirconyl complex was decomposed to generate zirconium oxide dispersion at the surface of the metal particles. The sintered nickel plate after trimming had the dimensions of 4 inches by 7 inches by 0.03 inch, and a pore volume of 43.1 percent. The average pore size was 1.3 microns per ASTM standard E128–61. The water flow rate through the plate at a differential pressure equivalent to 8 inches of water was 3 cc./min.-in.$^2$. Ultimate tensile strength of the plate was approximately 20,000 p.s.i.

EXAMPLE 8

A microporous type 316 stainless steel disc, 47 mm. in diameter, and 0.013 inch thick was produced for use as a fluid filtration unit. The microporous stainless steel used for this device is characterized by a high flow rate, very uniform pore size and high temperature pore and dimensional stability to 1200° C. in −65° F. dewpoint hydrogen and to 550° C. in air. The disc weighed approximately 2.5 grams and was produced from powder prepared as follows.

To two liters of distilled water were added 6 drops alkyl phenoxy polyethoxy ethanol sold by Rohm & Haas, Philadelphia, Pa., under the name Triton X–100 and in this solution were dissolved 2020 grams of aluminum nitrate. To the resulting solution were added 2500 grams of −325 mesh flake-shaped type 316 stainless steel powder Grade 756 sold by Alcan Metal Power Company, Elizabeth, N.J. The paste-like mixture was thinned out by the addition of one liter of distilled water. The pH of the slurry was 0.5 and the temperature 80° C. After mixing for 15 minutes, investment of the metal powder with hydrated aluminum oxide was carried out by the addition of 28 percent ammonium hydroxide solution. After 980 ml. of ammonium hydroxide had been added, the slurry became paste like; therefore, two liters of distilled water were added. To the thinned slurry were added 120 ml. of ammonium hydroxide and again the slurry became quite paste; therefore, one more liter of distilled water was added. The addition of 28 percent ammonium hydroxide was continued until the pH was increased to 7.3. One more liter of distilled water was added and the mixing was continued for another 15 minutes. This slurry was filtered through a vacuum filter. The filter cake was then washed with distilled water until the filtrate had a pH of 7. The water wash was followed by an acetone wash. The acetone-washed filter cake was air dried, and then sieved through a 48-mesh screen. The hydrated-alumina-invested powder was loaded into nickel trays, placed in a Inconel tube furnace and heat treated in hydrogen in the same way as described in Example 4.

The stainless steel powder containing ten weight percent aluminum oxide was loaded into a standard double acting die with a 2.75 inch diameter cavity. Discs were mechanically pressed at several compaction pressures with the following results:

| Disc. No. | Compaction Pressure, t.s.i. | Diameter, mm. | Thickness, mm. | Percent Pore Volume |
|---|---|---|---|---|
| 11027-76-1 | 2 | 69.85 | 0.39 | 72 |
| 11027-75-4 | 5 | 69.85 | 0.33 | 71 |
| 11027-77-9 | 10 | 69.85 | 0.33 | 64.8 |
| 11027-78-4 | 15 | 69.85 | 0.35 | 58.1 |

The discs were then sintered in hydrogen of approximately −65° F. dewpoint for 2 hours at 1225° C. The properties of the sintered discs are summarized as follows:

| Disc No. | Thickness, inches | Average Pore Size, Microns | Largest Pore Size, Microns | Percent Pore Volume |
|---|---|---|---|---|
| 11027-76-1 | 0.018 | 3.5 | 5.0 | 61.4 |
| 11027-75-4 | 0.013 | 2.25 | 3.25 | 46.3 |
| 11027-77-9 | 0.013 | 1.4 | 1.75 | 44.7 |
| 11027-78-4 | 0.014 | 1.25 | 1.6 | 43.6 |

Pore size was measured according to ASTM Standard E128–61. All discs were punched to the final size of 47 mm. Water flow rate through the discs at 30 p.s.i. differential pressure ranged from 34.5 ml./min-in.$^2$ at 1.25 micron average pore size to 336 ml./min.-in.$^2$ at 3.5 micron pore size.

EXAMPLE 9

Microporous type 304 stainless steel discs were produced for use as fluid filtration units. The discs produced, as described below, are characterized by very uniform pore size distribution and high temperature pore and dimensional stability to 1200° C. in −65° F. dewpoint hydrogen and in air to 550° C. The stainless steel discs were produced from powder prepared as follows.

In 3 liters of distilled water were dissolved 96.2 grams of zirconyl nitrate. To the above solution were added 2270 grams of −325 mesh flake-shaped type 304 stainless steel powder, purchased from Chas. Pfizer & Co., Inc., Minerals, Pigments and Metals Division, under the name of Stay Steel (RX–2063). After mixing for about 30 minutes, investment of the metal powder with dihydrated zirconyl diammino nitrate complex was carried out by the addition of 28% ammonium hydroxide solution until the pH of the slurry was raised to about 8. This required 50 cc. of the above ammonia solution. Mixing was continued for another 15 minutes and then the slurry was filtered through a vacuum filter. The filter cake was washed with distilled water until the pH of the filtrate was lowered to 7. The washed filter cake was placed in the drying oven and dried at 110° C., and then sieved through a 48-mesh screen. The zirconyl-complex-invested powder was loaded into nickel trays which were placed into an Inconel tube furnace and heat treated in hydrogen in the same way as described in Example No. 4 with the exception that the final annealing temperature was 1090° C. The stainless steel powder containing two weight percent zirconium oxide was loaded into a standard double acting die with a 1.5 inch diameter cavity. Discs were mechanically pressed at several compaction pressures with the following results:

| Disc No. | Compaction Pressure, t.s.i. | Diameter, mm. | Thickness, mm. | Percent Pore Volume |
|---|---|---|---|---|
| 11043-1-10 | 5 | 38.16 | 2.25 | 57.1 |
| 11043-1-12 | 15 | 38.16 | 1.80 | 45.4 |
| 11043-1-14 | 25 | 38.16 | 1.58 | 39.0 |

The discs were then sintered in hydrogen of approximately −65° F. dewpoint for two hours at 1225° C. The properties of the sintered discs are shown below:

| Disc No. | Thickness, mm. | Average Pore Size | Largest Pore Size | Percent Pore Volume |
|---|---|---|---|---|
| 11043-1-10 | 2.01 | 1.1 | 1.75 | 29.6 |
| 11043-1-12 | 1.64 | 0.4 | 0.75 | 21.7 |
| 11043-1-14 | 1.51 | 0.3 | 0.50 | 24.8 |

Pore size was measured according to ASTM Standard E128–61.

EXAMPLE 10

In a SWECO Vibro-Energy grinding mill were added 10 liters of distilled water; 6340 grams of nickel oxide grade M–15252–99 purchased from the Harshaw Chemical Co., Cleveland, Ohio; 3150 grams of black cupric oxide 101-Lot No. 95–558–001–72 obtained from the same company; and 526 grams of zirconyl nitrate secured from Varcalord Chemical Co. of Elizabeth, N.J. The water-oxide slurry was ground for 15 hours. The finely divided slurry was extended with 40 liters of distilled water. Then the slurry was passed again through the above grinding mill to homogenize the mixture and remove the remaining solids from the mill. This mixture was then passed through the spray-drier where the water was volatilized off and the solids were recovered fully dried. The finely divided dry nickel and copper oxides were reduced to free metals and alloyed with each other and the zirconyl nitrate decomposed to zirconia by heat treating in a stream of hydrogen at 700° C. for 6 hours. The resulting Monel powder (67% Ni-33% Cu) of average particle size of 0.7 micron as determined by the subsieve sizing method containing two weight percent zirconium oxide was mechanically compacted in a double acting die having a cavity of 1.5 inch diameter. Several compaction pressures as shown were used.

| Sample No. | Compaction Pressure, t.s.i. | Diameter, mm. | Thickness, mm. | Percent Pore Volume |
|---|---|---|---|---|
| 71-1 | 15 | 38.16 | 2.36 | 42 |
| 71-3 | 20 | 38.16 | 2.36 | 39.6 |

The discs were sintered in hydrogen of −30° F. dewpoint for 2 hours at 900° C. Pore volume of the sintered discs was 31.3 percent and 29.3 percent for samples 71–1 and 71–3 respectively. A mercury intrusion test was run indicating an average pore size of 0.05 micron. Transverse rupture strength for this material was 30,000 p.s.i.

EXAMPLE 11

In 3.5 liters of distilled water were dissolved 83 grams of zirconyl nitrate and to the solution was added 2000 grams of flake shaped Hastelloy B powder particles (62%-Ni-32%-Mo-6% Fe) purchased from United States Bronze Powders, Inc., Flemington, N.J. Standard sieve analysis of this powder showed that 93 percent of the particles pass through 100 mesh screen, 86 percent through 200 mesh and 49 percent through 325 mesh screen. Mixing of the slurry was continued for about 15 minutes and then 28 percent ammonium hydroxide solution was slowly added until the pH of the slurry had increased to about 8 to percipitate a zirconyl-ammino complex on the surface of the metal particles. Mixing was continued for 30 minutes and the slurry then filtered through a vacuum filter. The filter cake was washed with distilled water until the pH of the filtrate was lowered to 7. The washed filter cake was dried at 110° C. in the drying oven. The dried powder was sieved through a 100 mesh screen.

The sieved powder was used for preparing porous filter discs. The powder was compacted in a double action die with a cylindrical cavity of a diameter of 2.75 inches. The following compacts were pressed:

| Sample No. | Compaction Pressure, t.s.i. | Thickness, mm. | Percent Pore Volume |
|---|---|---|---|
| 1 | 2 | 0.65 | 70.7 |
| 2 | 5 | 0.54 | 64.6 |
| 3 | 10 | 0.40 | 56.6 |

The green discs were sintered in a hydrogen atmosphere of −65° F. dewpoint at 1150° C. for two hours. During this treatment the zirconyl-ammino complex was decomposed to zirconium oxide which remained dispersed at the surface of the metal. The sintered discs had the following properties:

| Sample No. | Thickness, mm. | Percent Pore Volume | Largest Pore Dia., microns | Average Pore Dia., Microns |
|---|---|---|---|---|
| 1 | 0.41 | 26.3 | 1.75 | 0.75 |
| 2 | 0.35 | 21.6 | 1.0 | 0.40 |
| 3 | 0.27 | 15.0 | 0.5 | 0.25 |

The pore size was determined by the AZTM E128–61 method.

EXAMPLE 12

A microporous superalloy plate was produced from L605 alloy powder (55% Co-10% Ni-20% Cr-15% W by weight) containing 4.5 weight percent thoria. The composite metal alloy-dispersoid powder was prepared following the chemical method described in the co-pending U.S. application Ser. No. 517,792. In 3,000 ml. of water were dissolved 1,061 grams $CoCl_2.6H_2O$, 193.5 grams $NiCl_2.6H_2O$, 96.0 grams $(NH_4)_6H_2W_{12}O_{40}$, 489.5 grams $CrCl_3.6H_2O$, and 47.0 grams $Th(NO_3)_4.4H_2O$. This solution was mixed with 1,590 ml. of water in which were dissolved 1,458 grams resorcinol, 2,682 grams sugar, and 109 grams concentrated HCl. Then, 1,574 grams of formalin (36–38% HCHO) were added to the mixture to polymerize the resorcinol-formaldehyde into a cross-linked condensate containing the metal salts solution within its structure. The polymeric mass was burned in air in a furnace heated to 600° C., until all the carbonaceous material was removed. A fine mixed-oxide powder was obtained, which was then treated in purified dry hydrogen for 5 hours at 700° C. to reduce the oxides of cobalt, nickel, and tungsten to the respective free metals. To reduce the chromium oxide remaining in the mixture, the product of the hydrogen reduction was mixed with lithium hydride powder, using a 10% excess of lithium over the calculated amont necessary to reduce all the chromium oxide present in the material. The mixture, placed in an Armco iron container closed with a well-fitting lid, was loaded into a hydrogen furnace which, after a hydrogen purge, was evacuated and heated to 800° C. After one hour dwell at this temperature, and after the subsequent cooling to room temperature, the reacted mixture was washed with water until all the excess lithium metal and the lithium oxide formed by the reaction with $Cr_2O_3$ were removed. The resulting metal powder, containing $ThO_2$ dispersed through it, had an average particle size of 0.4 micron, as determined by the specific surface area (BET) method.

The plate was produced by screening the powder into a 6 inch by 9.5 inch die cavity and mechanically compacting at 5 tons/inch$^2$. The plate was sintered in −65° F. dewpoint hydrogen for two hours at 1225° C. The sintered plate, after trimming, was 4.25 inches wide by 6.75 inches long by 0.02 inch thick. The plate had an average pore size of 1.25 microns, a largest pore size of 1.6 microns and a pore volume of 48 percent. Pore size was determined according to ASTM Standard E128–61. The plate had a water flow rate of 0.07 gallon/minute-ft.$^2$ at a differential pressure equivalent to 8 inches of water.

EXAMPLE 13

A microporous type 316 stainless steel disc was produced. The disc was characterized by high brightness, high formability, high flow rate and an average pore size in the range of 2 to 5 microns. The formability was evidenced by a bending angle of 180 degrees over a mandril of a radius corresponding to 10 times the sheet thickness.

In 520 milliliters of distilled water were dissolved 375 grams of chemically pure magnesium nitrate. After dissolution of the magnesium nitrate, 2 milliliters of Triton X–100 were added. To their solutions were added 517 grams of flake shaped −325 mesh type 316 stainless steel powder Grade 756 sold by Alcan Metal Powder Company. This powder was dispersed in the solution, allowed to mixed for about 30 minutes, and then invested with magnesium hydroxide by the addition of 28% ammonium hydroxide solution until the pH of the slurry was raised to about 8. This required 30 milliliters of the above ammonium hydroxide solution. Mixing was continued for another 15 minutes, then the slurry was filtered through a vacuum filter. The filter cake was washed with distilled water until the pH of the filtrate was lowered to 7. The water wash was followed by acetone wash to remove the free water present. The acetone-washed filter cake was allowed to air dry, until the powder was again free flowing. The air dried powder was sieved through a 48-mesh screen.

The magnesia-invested powder was placed into nickel trays which were loaded into the Inconel tube furnace and heat treated in the same way as described in Example No. 4 with the exception that the final annealing temperature was about 1100° C.

The powder containing 10 percent magnesium oxide was loaded into a double acting die set with a 2.75 inch diameter cavity and compacted at five tons per square inch to a thickness of 0.25 millimeter and a pore volume of 62.3 percent. The disc was then sintered in hydrogen of approximately −65° F. dewpoint for two hours at 1225° C. The sintered disc had a pore volume of 32.2 percent, a largest pore size of 5 microns and an average pore size of 4.25 microns. Water flow rate through the disc at 10 p.s.i. differential pressure was 237 ml./min.-in.$^2$.

What is claimed is:

1. A porous sintered material comprising a continuous framework of sintered metal particles defining a network of pore channels penetrating said material and wherein at least 70 percent of said pore channels are interconnected, inert dispersoid particles distributed throughout the framework of said sintered particles and on the surfaces of said pore channels, said dispersoid particles being present in an amount by volume fraction of from about 0.001 to about 0.20 and forming with said sintered metal particles a wetting angle of at least 90° as measured from the sintered metal-dispersoid particle interface to the sintered metal-atmosphere interface.

2. A material in accordance with claim 1 wherein said pore channels have diameters from about 0.1 micron to about 25 microns as measured by E128–61 ASTM maximum pore diameter and permeability test.

3. A material in accordance with claim 2 wherein the density of said material is from about 30 percent to about 90 percent of the theoretical density.

4. A material in accordance with claim 3 wherein the average diameter of said dispersoid particles is less than one-third the average pore channel diameter.

5. A material in accordance with claim 4 wherein the diameter of said dispersoid particles is 0.1 or less of the pore channel diameter.

6. Method of making a porous sintered metal material having a network of pore channels of diameters in the order of from less than one micron to about 25 microns with at least 70 percent of said pore channels being interconnected comprising the steps of forming an initial mixture of metal particles and inert dispersoid particles, said dispersoid particles being present in an amount of from about 0.1 percent to 20 percent by volume and forming with said sintered metal particles, a wetting angle of at least 90° as measured from the sintered metal-dispersoid particle interface of the sintered metal-atmosphere interface, compacting said mixture and sintering said compacted mixture at temperatures at least sufficient to promote sintering between said metal particles up to temperatures of 0.9 the absolute melting point of said metal particles for a time sufficient to result in a sintered material having a density from about 30 percent to 90 percent theoretical density.

7. A porous sintered metal material useful for infiltration with lubricants and as fluid flow distributors, filters and the like characterized in having interconnected pore channels of average pore diameter size in accordance with ASTM Standard E128–61 of from substantially less than one micron to about 25 microns and in exhibiting excellent pore channel stability at high temperatures, said material consisting essentially of a continuous framework of sintered metal particles defining a network of inter-connected pore channels penetrating said material, inert dispersoid particles distributed throughout the framework of said sintered particles and on the surfaces of said pore channels, said dispersoid particles being present in an amount by volume fraction of from about 0.001 to about 0.20 and forming with said sintered metal particles a wetting angle of at least 90° as measured from the sintered metal-dipsersoid particle interface to the sintered metal-atmosphere interface and wherein at least 70 percent of said pore channels are interconnected.

8. A material in accordance with claim 7 wherein the density of said material is from about 30 percent to about 90 percent of the theoretical density.

9. A material in accordance with claim 7 wherein said pore channels have average pore diameter sizes of from less than one micron to about 5 microns.

References Cited

UNITED STATES PATENTS

| | | | |
|---|---|---|---|
| 1,988,861 | 1/1935 | Thorausch et al. | 75—200 |
| 2,229,330 | 1/1941 | Langhammer et al. | 29—182.5 |
| 2,630,383 | 3/1953 | Schwartz et al. | 75—203 |
| 2,983,034 | 5/1961 | Humenik et al. | 29—182.5 |
| 3,175,904 | 3/1965 | Grant et al. | 29—182.5 |
| 3,248,183 | 4/1966 | Powell et al. | 29—182 |
| 3,266,893 | 8/1966 | Duddy | 75—222 |
| 3,303,825 | 2/1967 | Shuman et al. | 29—182.8 |

BENJAMIN R. PADGETT, *Primary Examiner.*

R. L. GRUDZIECKI, *Assistant Examiner.*

UNITED STATES PATENT OFFICE
CERTIFICATE OF CORRECTION

Patent No. 3,397,968 August 20, 1968

Henry W. Lavendel et al.

It is certified that error appears in the above identified patent and that said Letters Patent are hereby corrected as shown below:

Column 1, after line 10, insert the following:

ABSTRACT OF THE INVENTION

Sintered metal or metal alloy materials having interconnected pore channels exhibiting excellent pore stability at high temperatures and useful as fluid flow distributors and filters in the food, drug and beverage industries. The pore channels are controllable to average pore diameter sizes significantly less than one micron. The materials have a dispersed phase of critical amounts of inert particles distributed throughout a continuous framework of sintered metal particles and on the surfaces of pore channels defined by the sintered particles. The inert particles form with the sintered particles a wetting angle of at least 90° as measured from the sintered metal-inert particle interface to the sintered metal-atmosphere interface. Where pore sizes smaller than about 5 microns are required by the art, paper, plastic, carbon and ceramic filters are currently used since metal filters having the requisite small pore size and uniformity are unavailable. These filters, however, in contrast to the materials of the invention, break down under high pressures and temperatures, shock and vibration and are not cleanable or reusable. The available metal filters having large pore sizes do not exhibit the high temperature pore stability characteristic of the materials of the invention.

Signed and sealed this 24th day of February 1970.

(SEAL)
Attest:

EDWARD M.FLETCHER,JR.
Attesting Officer

WILLIAM E. SCHUYLER, JR.
Commissioner of Patents